United States Patent Office 2,779,803
Patented Jan. 29, 1957

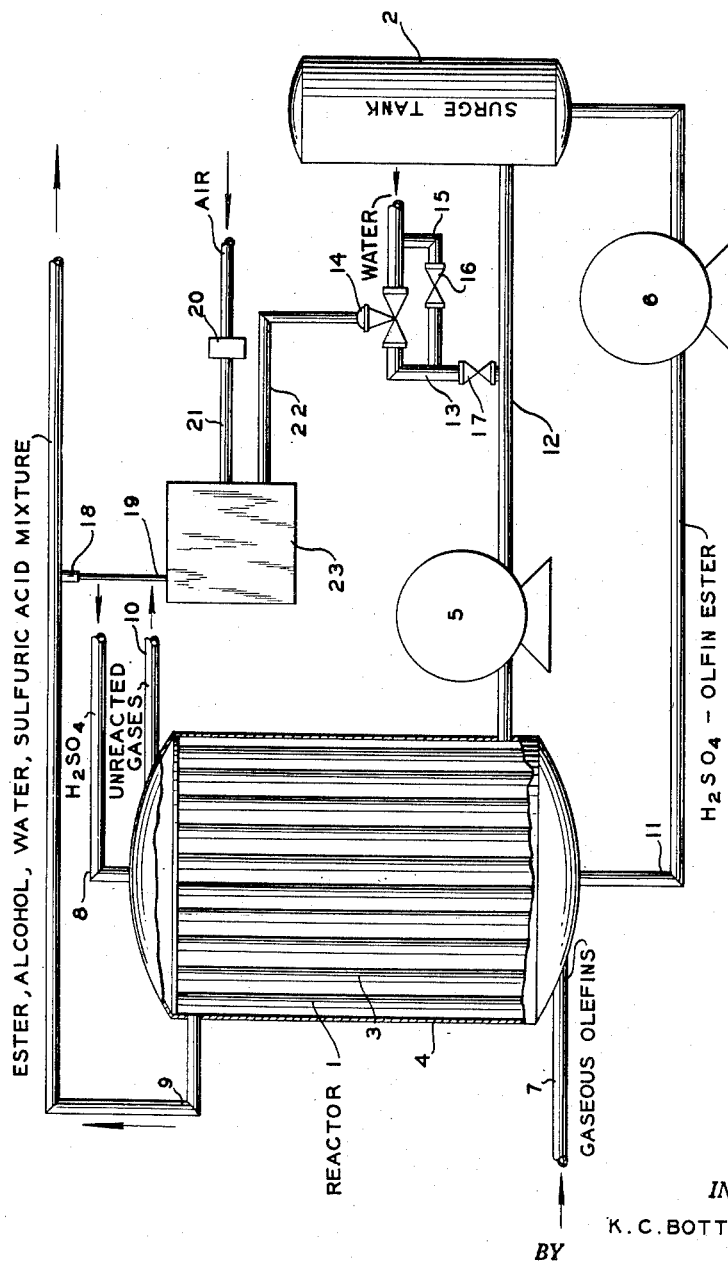

2,779,803

PRODUCTION OF ALCOHOLS AND RELATED PRODUCTS WITH ENDOTHERMIC - EXOTHERMIC CONTROLLED HEAT EXCHANGE

Kenneth C. Bottenberg, Bartlesville, Okla., assignor to Phillips Petroleum Company, a corporation of Delaware Application February 18, 1952, Serial No. 272,141

6 Claims. (Cl. 260—639)

This invention relates to the production of alcohols and products in the production of which there is involved a heat release and a heat intake. In one aspect the invention relates to the production of olefin-sulfuric acid ester. In another aspect the invention relates to the reaction of an olefin with an acid in a heat exchanger zone. In still another aspect the invention relates to the simultaneous heat exchange esterification of an olefin with an acid and hydrolysis of an olefin-acid ester. In a further aspect the invention relates to a combination apparatus for the production of alcohols from an olefin and an acid, e. g. sulfuric acid, by first forming the ester of the acid and then hydrolyzing said ester substantially in a heat exchanger of the tube-bundle and shell type. In a still further aspect the invention relates to the control of the temperature of esterification and of hydrolysis by employing a tube-bundle and shell type heat exchanger in which the esterification and only so much of the hydrolysis of the ester formed is effected, by the addition of the proper amount of water, as will maintain the desired olefin-in-acid absorption or esterification temperature, the remainder of the water and heat required for complete hydrolysis being added in another zone or place, for example, as steam. In still another aspect the invention is concerned with and provides a combination of steps and apparatus elements for the automatically controlled production of alcohols from olefins and sulfuric acid.

The importance of the present invention will be realized when it is considered that the addition of olefins to sulfuric acid may lead to several different products, namely polymers, acid soluble oils and carbonaceous and tarry materials of undetermined constitution and also the presently desired product olefin-sulfuric ester. Excessive temperature during the addition reaction promotes the side reactions leading to undesirable products. Therefore, it is of fundamental or essential importance to provide large quantities of heat removing medium, ordinarily, by refrigeration in large quantities, during the absorption step.

It is noted that according to the concept of this invention the heat requirement of the hydrolysis step is considerably greater than the heat released during the absorption step. Therefore, it is possible to provide for all of the cooling medium required providing that the heat removal is practiced in a suitable manner as set forth herein employing as coolant the olefin-ester which is hydrolyzed. This provision of a highly efficient coolant for the absorption step involving utilization of the heat removed represents an improvement of considerable magnitude. Thus, the art has been provided with an efficient coolant thereby reducing the size of heat exchange equipment. The more efficient coolant has the additional advantage of utilizing the heat removed.

Several processes for the manufacture of alcohols from olefinic hydrocarbons are known. For example: olefins may be absorbed in mineral acids such as sulfuric, phosphoric and hydrofluoric acid to form the inorganic acid addition products with the olefin. The resulting addition products are then hydrolyzed to form the corresponding alcohol and dilute acid. The alcohol is recovered from the dilute acid by steam distillation, fractionation and/or extraction.

Another means for manufacturing alcohols from olefins involves the direct hydration of olefins at high pressures and relatively high temperatures by contacting the olefins with a solid catalyst in the presence of steam or dilute (approximately 2 to 20 percent) sulfuric acid.

The heat evolved in the absorption step presents a major refrigeration expense if the process is to be operated at a practical rate and with practical size apparatus. The direct hydration of olefins has been utilized as a means for eliminating the problem of refrigeration. However, the direct hydration of olefins involves the use of higher temperatures with resultant losses from side reaction and higher pressures with entailed heavier equipment.

It is a principal object of this invention to provide a means for the control of reactor temperature during the absorption of olefin in sulfuric acid.

It is a further object of this invention to provide an efficient coolant for the removal of reaction heat during the absorption of olefins in sulfuric acid.

It is another object of this invention to provide an improved process for the production of alcohol by absorption of olefins in sulfuric acid followed by hydrolysis of the olefin sulfuric ester to obtain alcohol and dilute sulfuric acid from which the alcohol can be recovered by distillation.

It is a further object of this invention to provide a process which will be readily adaptable to the production of various alcohols according to the available olefin, for example, ethanol from ethylene, propanol from propylene and butanols from the various butylenes.

Thus, according to this invention there are provided an apparatus and a method for the production of an alcohol by absorption of the corresponding olefin in an acid and then hydrolyzing the addition product obtained in which method the absorption is effected by contacting the olefin with the acid in one side of a tube-bundle and shell type heat exchanger and controlling the temperature of said absorption by passing already formed addition product through the other side of said heat exchanger. The heat required for the complete hydrolysis, as stated, can be supplied with steam, preferably live steam, and can be effected in a separate still provided for this purpose.

The apparatus according to the invention comprises, in combination, a substantially vertically disposed tube-bundle and shell type heat exchanger; an inlet pipe for acid at the top of said exchanger in open communication with the tubes therein; a gas outlet at the top of said exchanger in open communication with the tubes thereof; an outlet at the top of said exchanger in open communication with the shell space surrounding the tubes thereof to remove partially hydrolyzed ester, water and acid therefrom; an inlet at the bottom of said exchanger in open communication with said tubes for introducing thereinto olefins to be absorbed in acid; an outlet at the bottom of said exchanger in open communication with said tubes for removing olefin-acid therefrom; an inlet at the bottom of said exchanger in open communication with the shell space surrounding said tubes for introducing olefin-acid thereinto for hydrolysis; a temperature sensing device operatively connected to said outlet for removing partially hydrolyzed ester, etc., from said exchanger; a surge tank operatively connected with pump-equipped pipes to maintain circulation of olefin-acid and water to, through and from said shell; a water inlet pipe communicating through a throttle valve with the pipe connecting said tank and said shell for conveying fluid from said tank to said shell; a motor valve on said water inlet pipe; said temperature sensing device being operatively connected to said motor valve; and a by-pass pipe around said motor valve.

It will be understood that while countercurrent flow in the heat exchanger has been described coflow is within the scope of the present invention, which is primarily in the combination of steps and elements employed rather than in the specific design or operation of said elements. As stated, it is within the scope of the present invention to provide for a fully automatic operation by providing suitable control mechanism, within the skill of the art, to the olefin and acid inlets.

The reactions involved in the practice of the invention are well known and can be represented as follows

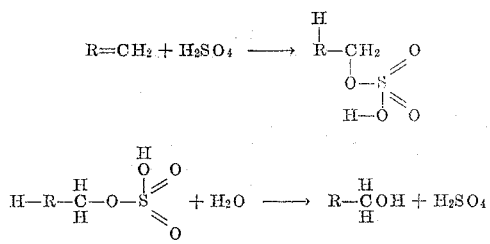

The first of these reactions is exothermic while the second is endothermic. The heat evolved in the first reaction while large is only approximately one-sixth that required for the second reaction, therefore the second reaction mixture can be utilized to provide an efficient coolant for the first reaction.

The following description of a process utilizing this invention for the production of ethanol from ethylene shows one embodiment of this invention, and is best understood by reference to the attached drawing.

Sulfuric acid (66 Baumé) at 70° C. is pumped through line 8 into the top of and down through tubes 3 of reactor 1. An ethylene-containing gas at 70° C. and at a pressure of 15 atmospheres is introduced at the bottom of the tubes 3 of reactor 1 through line 7 and is absorbed by the descending sulfuric acid. The resulting ethylene sulfuric ester is removed through line 11 and is pumped by pump 6 to surge tank 2. Simultaneously, ethylene sulfuric ester from surge tank 2 is pumped by means of pump 5 and line 12 to the shell side of reactor 1. Water is introduced to the ethylene sulfuric ester in line 12 by way of line 13. Unreacted gas is removed from the top of reactor 1 by way of line 10 and a partially hydrolyzed ethylene sulfuric ester mixture is removed by way of line 9 from the top of the shell of reactor 1. This material is sent to a still not shown where it is countercurrently contacted with superheated steam to complete the hydrolysis, take a mixture of steam and alcohol vapors overhead, condense the overhead to recover a dilute alcohol solution, and reconcentrate the acid as a bottoms product. The dilute alcohol is concentrated by simple distillation or can be first extracted with an aromatic hydrocarbon followed by distillation of the alcohol from the hydrocarbon. The reactor temperature is controlled by the degree of hydrolysis carried out in the shell side of the reactor. The degree of hydrolysis is controlled by means of flow regulating devices operating to proportionate the water entering line 12. Gate valve 17 is open and throttle valve 16 is set to deliver, through bypass line 15, the required water to hold the temperature of reactor 1 at 70±5° C. A thermocouple located in reactor effluent line 9, supplies through leads 18 and 19 the required potential to activate a temperature sensitive air meter 23. This meter is adjusted so that a temperature of more than 70° in the reactor effluent in line 9 opens a valve (not shown) which allows air passing through filter 20, and line 21 to enter line 22 and increase the pressure on the diaphragm of motor valve 14. Thereby motor valve 14 is opened and additional water enters line 12 by way of line 13. When the temperature of the reactor effluent in line 9 drops below 70° C. meter 23 operates to close the air valve and opens a vent which reduces the pressure on the diaphragm of motor valve 14 thereby partially closing valve 14, and consequently, reducing the quantity of water introduced to line 12.

When producing ethanol sulfuric acid of 91 weight percent (66 Baumé) will be used as absorbent at temperatures of 20° to 100° C. preferably from 50° to 70° C. and pressures from 5 atmospheres to 20 atmospheres, preferably from 10 atmospheres to 15 atmospheres.

When producing propanol temperature will be reduced to 20° to 80° C. or preferably to from about 40° to 60° C. Pressure will be maintained low so that the propylene remains in the gas phase at the temperature being used. Acid strength between about 65 to 80 weight percent preferably about 75 weight percent has been found most desirable.

In producing butanols a further diminishing of temperature is beneficial so that 20° to 50° C. have been found operable. A preferred range is from 20° to 40° C. Pressures must be maintained near the dew point of the butylene at the temperature being utilized in order to minimize the size of equipment required.

Variation and modification are possible within the scope of the foregoing disclosure, the drawing and the appended claims to the invention the essence of which is that a method and apparatus for the controlled esterification of olefins and hydrolysis of the esters formed have been provided, the method making use of a heat exchanger to utilize heat of absorption for hydrolysis thereby completely providing all of the temperature control and coolant required for the absorption step and the apparatus comprising in combination elements, as set forth, shown and described, to accomplish the production of alcohols and other reactions which involve a heat release and heat intake.

I claim:

1. The production of a final endothermically produced liquid chemical product, which is produced by way of an exothermically produced intermediate liquid product, which comprises forming said exothermically produced intermediate liquid product by passing the reactants from which it is formed along and in direct contact with one side of a heat exchanger surface in a heat exchanger, removing intermediate product thus produced from contact with said one side of said heat exchanger, then passing the thus produced intermediate liquid product along and in direct contact with the other side of said heat exchanger surface in indirect heat exchange relationship with additional quantities of said intermediate product which is being exothermically produced, thus conducting through the said surface only heat from said exothermically produced intermediate product to the production of the final endothermically produced liquid chemical product, said heat at least in part furnishing the heat requirement of the production of said final liquid chemical product, detecting the temperature of the reaction producing said exothermically produced intermediate liquid product and varying the rate of flow of said intermediately produced product along said other side of said heat exchanger surface inversely responsive to changes of a desired temperature of said exothermically produced intermediate product on said one side of said heat exchanger surface, thereby controlling the temperature of the reaction producing said exothermically produced intermediate product as well as at least in part controlling the temperature of the reaction producing said endothermically produced final product.

2. In the production of an alcohol involving esterification of an olefin and hydrolysis of the ester produced the steps in combination of contacting in one side of a heat exchanger an olefin containing gas and an acid and controlling the temperature of the reaction which takes place between the olefin and the acid by passing already formed olefin-acid reaction product under hydrolysis conditions including the controlled addition of water through the other side of the said heat exchanger.

3. A production according to claim 2 wherein the hydrolysis conditions and therefore the extent of hydrolysis accomplished in said heat exchanger is controlled by correlating the temperature of the at least partially hydrolyzed effluent from the heat exchanger with the establishment of the said hydrolyzing conditions.

4. A production according to claim 3 wherein the quantity of water added to the olefin-acid reaction product undergoing hydrolysis is controlled responsive to the temperature of the hydrolysis effluent from the heat exchanger.

5. The production of an alcohol by reaction of an olefin with an acid which comprises the steps of passing through one side of a heat exchanger zone countercurrent with each other said acid and olefin thereby absorbing said olefin in said acid and forming an olefin-acid reaction product releasing heat; adding to said olefin-acid reaction product water with which to control the extent of its hydrolysis when placed under conditions of hydrolysis; passing said olefin-acid reaction product and added water mixture into another side of the heat exchanger zone and therein heating it by virtue of said heat release to cause at least a partial hydrolysis thereof; discharging the partially hydrolyzed mixture from said heat exchanger zone; detecting continuously the temperature of said mixture and varying the rate of addition of said water which is added to said olefin-acid reaction product responsive to said temperature thus to control the temperature of said olefin-acid addition reaction the endothermic heat required by the hydrolysis being increased or decreased as the rate of water addition is increased or decreased, respectively, thereby providing said control of said temperature of said olefin-acid addition reaction.

6. In the production of an alcohol involving esterification of an olefin and hydrolysis of the ester produced the steps in combination of contacting on one side of a heat exchanger surface an olefin containing gas and an acid and controlling the temperature of the reaction which takes place between the olefin and the acid by passing already formed olefin-acid reaction product under hydrolysis conditions including the addition of $H_2O$ into contact with the other side of the said heat exchanger surface.

References Cited in the file of this patent
UNITED STATES PATENTS

| | | |
|---|---|---|
| 2,093,434 | Groombridge et al. | Sept. 21, 1937 |
| 2,096,879 | Brooks | Oct. 26, 1937 |
| 2,263,363 | Menshih | Nov. 18, 1941 |
| 2,283,832 | Thomas | May 19, 1942 |
| 2,389,448 | Mekler | Nov. 20, 1945 |
| 2,607,567 | Hobbs | Aug. 19, 1952 |
| 2,643,100 | Bonnaud | June 23, 1953 |